United States Patent
Riddoch et al.

(10) Patent No.: US 12,375,380 B2
(45) Date of Patent: Jul. 29, 2025

(54) HOST POLLING OF A NETWORK ADAPTER

(71) Applicant: XILINX, INC., San Jose, CA (US)

(72) Inventors: David James Riddoch, Cambridgeshire (GB); Derek Edward Roberts, Cambridge (GB); Kieran Mansley, Cambridge (GB); Steven Leslie Pope, Cambridge (GB); Sebastian Turullols, Los Altos, CA (US)

(73) Assignee: XILINX, INC., San Jose, CA (US)

( * ) Notice: Subject to any disclaimer, the term of this patent is extended or adjusted under 35 U.S.C. 154(b) by 68 days.

(21) Appl. No.: 18/221,617

(22) Filed: Jul. 13, 2023

(65) Prior Publication Data
US 2025/0023808 A1    Jan. 16, 2025

(51) Int. Cl.
*H04L 43/103* (2022.01)
*H04L 67/1097* (2022.01)

(52) U.S. Cl.
CPC ........ *H04L 43/103* (2013.01); *H04L 67/1097* (2013.01)

(58) Field of Classification Search
CPC .......................... H04L 43/103; H04L 67/1097
USPC ....................................................... 709/224
See application file for complete search history.

(56) References Cited

U.S. PATENT DOCUMENTS

| | | | |
|---|---|---|---|
| 7,831,749 B2 | 11/2010 | Pope et al. | |
| 8,948,020 B2 * | 2/2015 | Astigarraga | G06F 3/067 370/242 |
| 9,053,106 B2 * | 6/2015 | Edwards | G06F 11/3006 |
| 10,230,665 B2 * | 3/2019 | Lovett | H04L 47/821 |
| 10,320,677 B2 * | 6/2019 | Caulfield | H04L 47/32 |
| 10,558,595 B2 * | 2/2020 | Wilkinson | G06F 9/00 |
| 10,673,648 B1 * | 6/2020 | Viljoen | G06F 13/4282 |
| 10,880,266 B1 * | 12/2020 | Shribman | G06F 8/71 |
| 11,057,446 B2 * | 7/2021 | Shribman | H04L 67/02 |
| 11,411,922 B2 * | 8/2022 | Shribman | G06F 16/955 |
| 11,516,311 B2 * | 11/2022 | Klein | G06N 5/04 |
| 11,595,472 B2 * | 2/2023 | Gerlitz | H04L 43/062 |
| 11,616,723 B2 * | 3/2023 | Friedman | H04L 47/11 370/235 |
| 11,916,800 B2 * | 2/2024 | Arditti Ilitzky | H04L 47/6255 |
| 11,921,605 B2 * | 3/2024 | Kurapati | G06F 11/2028 |
| 11,991,246 B2 * | 5/2024 | Shilimkar | H04L 47/2408 |

(Continued)

OTHER PUBLICATIONS

Flajsilk, Mario, et al. "Network Interface Design for Low Latency Request Response Protocols," USENIX, THe Advanced Computing Systems Association, Jun. 26, 2013 (13 pages). (Year: 2013).*

(Continued)

*Primary Examiner* — Melvin H Pollack (74) *Attorney, Agent, or Firm* — Patterson + Sheridan, LLP (57) ABSTRACT

Embodiments herein describe a host that polls a network adapter to receive data from a network. That is, the host/CPU/application thread polls the network adapter (e.g., the network card, NIC, or SmartNIC) to determine whether a packet has been received. If so, the host informs the network adapter to store the packet (or a portion of the packet) in a CPU register. If the requested data has not yet been received by the network adapter from the network, the network adapter can delay the responding to the request to provide extra time for the adapter to receive the data from the network.

18 Claims, 4 Drawing Sheets

(56) References Cited

U.S. PATENT DOCUMENTS

| | | | | |
|---|---|---|---|---|
| 12,026,116 | B2* | 7/2024 | Kutch | G06F 12/0802 |
| 12,047,442 | B1* | 7/2024 | Zhang | H04L 67/1042 |
| 12,143,460 | B2* | 11/2024 | Shribman | H04L 65/612 |
| 12,143,461 | B2* | 11/2024 | Shribman | H04L 67/59 |
| 2015/0295830 | A1* | 10/2015 | Talla | H04L 49/901 |
| | | | | 370/235 |
| 2021/0320866 | A1* | 10/2021 | Le | H04L 47/115 |
| 2022/0263913 | A1* | 8/2022 | Zhang | G06F 3/0604 |
| 2022/0345417 | A1* | 10/2022 | Kasichainula | H04L 47/30 |
| 2024/0163219 | A1* | 5/2024 | Vaddadi | H04L 47/626 |
| 2024/0267792 | A1* | 8/2024 | Zhu | H04W 28/0236 |

OTHER PUBLICATIONS

International Search Report and Written Opinion dated Sep. 17, 2024 for PCT/US2024/033337.

Flajslik, Mario, et al., "Network Interface Design for Low Latency Request-Response Protocols", USENIX, The ADvanced Computing Systems Association, Jun. 26, 2013 (13 pages).

* cited by examiner

HOST POLLING OF A NETWORK ADAPTER

TECHNICAL FIELD

Examples of the present disclosure generally relate to a host polling a network adapter to retrieve received packets.

BACKGROUND

There has been accelerated growth in cloud infrastructure to keep up with the ever increasing demand for services hosted in the cloud. To free up server central processing units (CPUs) to focus on running the customers' applications, there has been an increasing need to offload compute, network, and storage functions to accelerators. These accelerators are part of the cloud's hyper-converged infrastructure (HCI) giving the cloud vendor a simpler way to manage a single customer's or multiple customers' varying compute-centric, network-centric, and storage-centric workloads. Many cloud operators use SmartNICs to help process these workloads. Generally, SmartNICs are NICs that include data processing units that can perform network traffic processing, and accelerate and offload other functions, that would otherwise be performed by the Host CPU if a standard or "simple" NIC were used. SmartNICs are adept at converging multiple offload acceleration functions in one component, adaptable enough to accelerate new functions or support new protocols, and also offer the cloud vendor a way to manage virtualization and security for the case of multiple cloud tenants (e.g., customers) concurrently using the HCI. The term Data Processing Unit (DPU) is also used in lieu of SmartNIC, to describe the collection of processing, acceleration and offload functions for virtualization, security, networking, compute and storage or subsets thereof.

A network adapter (e.g., a network card or a SmartNIC) is responsible for moving data between a host operating system or application to and from a network wire. There are two directions of data movement: from the host to the network (transmit) and from the network to the host (receive). Movement of data in the transmit direction is usually initiated by the host. Movement of data in the receive directions is usually initiated by the network card. On the host, the data that is sent or received is stored in host memory (or the CPU's cache of the host memory). To allow the host to have multiple independent senders and receivers (e.g. different applications running on different CPUs) the network adapters support send, receive, and event queues being used concurrently.

The network adapter is currently physically connected to the host CPUs via a standard bus such as PCIe that is responsible for allowing the host and the network adapter to communicate using a standard protocol. PCIe includes a physical layer describing how the wires of the bus are used to signal across the bus, and a transport layer protocol providing semantics such as memory read and write operations.

Currently for transmit, there are two main methods for moving data from host memory to the network card (i.e., transmitting data to the network). The first technique is direct memory access (DMA) where the host writes a small descriptor into a queue giving the address of the data it wishes to transmit to the network adapter and rings a doorbell on the network adapter. The advantage of DMA is that after writing the descriptor, the CPU is freed from any involvement in the data movement and can get on with other useful work. The second technique is Programmed Input/Output (PIO) where, rather than requiring the network adapter read the data from host memory, the host CPU can instead write it directly to the NIC.

Currently for receive (i.e., receiving data from the network), DMA is the main technique used for moving data to the host. The network adapter knows where in host memory to deliver the next packet. The host CPU reserves memory for the network adapter to write data into, and publishes descriptors to the network adapter describing these regions of memory. The host CPU then polls this location (e.g., using a tight loop) to see when the network adapter has written into this memory location. However, the disadvantage of this approach is that instead of delivering the packet into a CPU cache, the data may instead be placed in main memory (e.g., DRAM). In this case, the location the CPU is polling gets evicted from the cache and the application does a read from main memory and fetches the data from there, which is very slow in comparison to the network adapter delivering the packets directly into the cache. Thus, the current DMA receive techniques can result in large latencies which may be undesirable for low latency applications such as stock trading and other use cases.

SUMMARY

One embodiment described herein is a network adapter that includes circuitry configured to receive a request from a host central processing unit (CPU) for data in a packet, wherein the network adapter receives the packet from a network; upon determining the data has not been received, waiting a period of time before replying to the request; and upon determining the data has not been received before the period of time has passed, replying to the request indicating the data has not yet been received.

One embodiment described herein is a method that includes receiving, at a network adapter, a request from a host CPU for data in a packet, wherein the network adapter receives the packet from a network; upon determining the data has not been received, waiting a period of time before replying to the request; and upon determining the data has not been received before the period of time has passed, replying to the request indicating the data has not yet been received.

One embodiment described herein is a device that includes a network adapter that includes circuitry configured to receive at least a portion of a packet from a network, and forward the portion of the packet to a host CPU only after the network adapter has received a request from the host CPU for the portion of the packet.

BRIEF DESCRIPTION OF DRAWINGS

So that the manner in which the above recited features can be understood in detail, a more particular description, briefly summarized above, may be had by reference to example implementations, some of which are illustrated in the appended drawings. It is to be noted, however, that the appended drawings illustrate only typical example implementations and are therefore not to be considered limiting of its scope.

To facilitate understanding, identical reference numerals have been used, where possible, to designate identical elements that are common to the figures. It is contemplated that elements of one example may be beneficially incorporated in other examples.

DETAILED DESCRIPTION

Various features are described hereinafter with reference to the figures. It should be noted that the figures may or may not be drawn to scale and that the elements of similar structures or functions are represented by like reference numerals throughout the figures. It should be noted that the figures are only intended to facilitate the description of the features. They are not intended as an exhaustive description of the embodiments herein or as a limitation on the scope of the claims. In addition, an illustrated example need not have all the aspects or advantages shown. An aspect or an advantage described in conjunction with a particular example is not necessarily limited to that example and can be practiced in any other examples even if not so illustrated, or if not so explicitly described.

Embodiments herein describe a host that polls a network adapter to receive data from a network. That is, rather than the traditional approach where the network adapter delivers received data to the host using DMA, in the embodiments herein the host/CPU/application thread polls the network adapter (e.g., the network card, NIC, or SmartNIC) to determine whether a packet has been received. If so, the host informs the network adapter to store the packet (or a portion of the packet) in a CPU register. As such, this prevents the packet from being stored in main memory (or the cache hierarchy) as may occur with DMA, thereby reducing latency.

In some embodiments, some of the packet may be stored in the CPU registers while other portions of the packet are stored in cache (or even main memory) using DMA. For example, the host may poll the network adapter to request the headers of the packet be stored in the CPU registers. The CPU (or the application thread executing on the CPU) can begin processing the headers while the network adapter uses DMA to store the rest of the packet in the cache or main memory. This still reduces latency since the CPU can process the headers while the rest of the packet (e.g., the payload) is being stored in memory using DMA. Thus, some of the packet may be retrieved using the CPU polling techniques described herein while the rest of the packet can be stored by the network adapter using DMA.

When polling the network adapter, the network adapter can delay responding to the CPU's request if the requested packet has not yet arrived. That is, instead of immediately replying that the packet has not yet arrived, the network adapter can delay responding to the CPU's request in hopes the packet will arrive soon. This can further mitigate latency.

Figure 1:
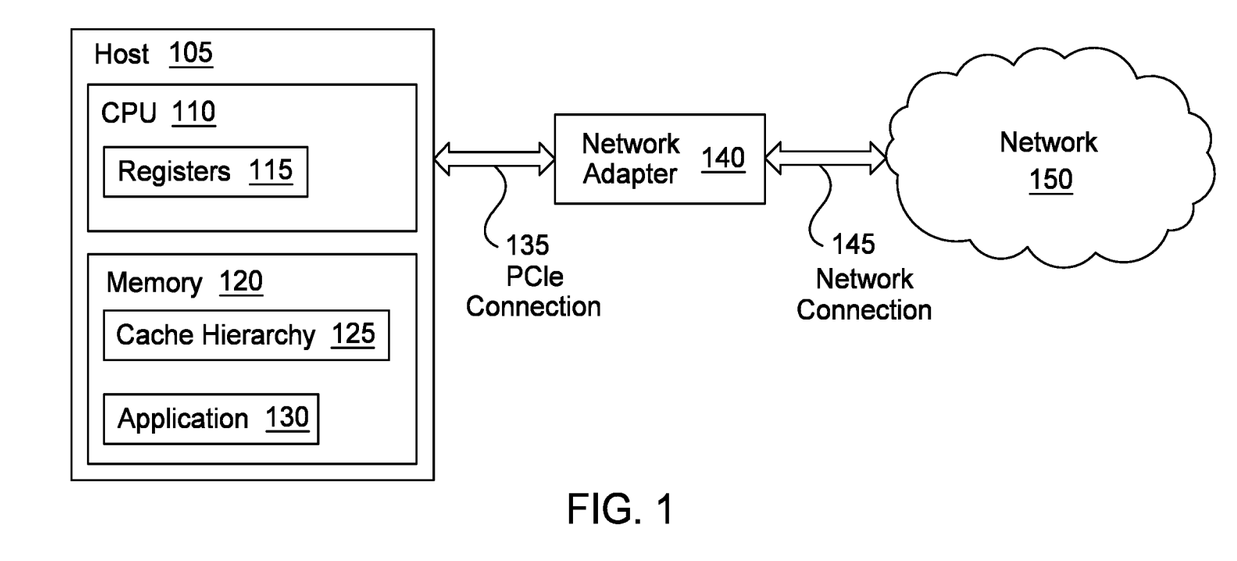
FIG. 1 illustrates a system with a network adapter, according to one embodiment.

FIG. 1 illustrates a system with a network adapter 140, according to one embodiment. The system includes a host 105 connected to a network 150 via the network adapter 140. That is, the network adapter 140 (also referred to as a network card, NIC, or SmartNIC) facilitates communication between the host 105 (e.g., a desktop, laptop, server, etc.) and the network 150 (e.g., the Internet or a local access network (LAN)). The network adapter 140 can include circuitry to perform the embodiments described herein. This circuitry can be a processor and memory, an application specific integrated circuit (ASIC), a field programmable gate array (FPGA), a system on a chip (SoC), and the like.

The host 105 includes a CPU 110 and memory 120. The CPU 110 can include one or more processors which each can include one or more processing cores. The CPUs 110 can include registers 115. As discussed in more detail below, the CPUs 110 can send requests to the network adapter 140 for specific data (e.g., a portion of a received packet) which is then stored in the registers 115.

The memory 120 can include volatile memory elements, non-volatile memory elements, or combinations thereof. In this example, the memory 120 includes a cache hierarchy 125 (e.g., Level 1 (L1), Level 2 (L2), etc.). In one embodiment, some or all of the cache hierarchy 125 is disposed on the same integrated circuits that form the CPUs 110. For example, the L1 cache may be memory that is integrated onto the CPUs 110, while the L2 cache may be separate memory (e.g., SRAM).

The memory 120 also includes an application 130 (e.g., a user application). The application 130 is executed by the CPU 110, and in the examples herein, can transmit packets to the network 150 and receive packets from the network 150 using the network adapter 140. For example, the application 130 may be a low-latency application that wants to receive packets from the network 150 as fast as possible.

The network adapter 140 is connected to the host 105 using a PCIe connection 135, and is connected to the network 150 using a network connection 145. To transmit data from the host 105 to the network, DMA or PIO can be used. In DMA, the host 105 writes a small descriptor into a queue giving the address of the data it wishes to transmit to the network adapter 140 and rings a doorbell on the network adapter 140. The network adapter 140 issues one or more read requests on the PCIe bus (e.g., PCIe connection 135) to pull the descriptor and the data described by it, and then transmits the data on the network connection 145. Once it has been transmitted the network adapter 140 notifies the host 105 by writing a completion event to a queue in host memory 120. In one embodiment, there are two queues: the transmit queue of descriptors, and the event queue of completions. The advantage of DMA is that after writing the descriptor, the CPU 110 is freed from any involvement in the data movement and can get on with other useful work.

In PIO, rather than requiring the network adapter 140 to read the data from host memory 120, the host CPU 110 can instead write it directly to the network adapter 140. The network adapter 140 exposes a region of memory addresses to the host 105, and when the host 105 is ready to send data it writes the data to that region of memory 120, treating this region of memory as a queue of data to send. Each data packet is often accompanied by a small block of metadata to inform the network adapter 140 about things like how long the packet is, so that the network adapter 140 can distinguish whether two writes are part of one packet or should be transmitted as separate packets. The network adapter 140 monitors for incoming writes to its memory, and when it has sufficient data to form a packet sends the packet on the network connection 145. The host 105 is careful not to overwrite data that has not yet been sent to the network 150. It will typically write to the network adapter 140 PIO queue in a circular fashion. Flow control can be implemented using either read and write pointers into the queue (e.g., the network adapter 140 owns the read pointer, and advances it when it has read out of its memory and sent data on the network connection 145). The host CPU 110 owns the write pointer, and advances it when it adds data to the queue. The advantage of PIO over DMA is that only a single bus transition is used to move the data, so it is lower latency, but the CPU is busy the whole time the data is being moved since it is performing the writes.

In the receive path, the embodiments herein describe using the CPU 110 to poll the network adapter 140 to retrieve at least a portion of a packet, rather than the traditional way of the network adapter using DMA to store (or push) received packets in host memory 120. However, before discussing techniques for polling the network adapter, additional features of performing a DMA are described. In DMA, the network adapter 140 should know where in host memory 120 to deliver the next packet. The host CPU 110 reserves memory 120 for the network adapter 140 to write data into, and publishes descriptors to the network adapter 140 describing these regions of memory (much like it did for the transmit descriptors). When the network adapter 140 has a packet to deliver, the adapter 140 uses the next available descriptor, and issues one or more bus transactions to perform writes to that host memory 120. A single descriptor may allow multiple packets to be delivered sequentially. Each delivered packet may have an accompanying block of metadata generated by the network adapter 140 to describe the packet (e.g. length, and outcome of any processing like checksums the network adapter 140 has performed). To notify the host 105 that a packet has been delivered, the network adapter 140 will typically write an event to an event queue in host memory 120, and if necessary raise an interrupt. Flow control is performed by the host 105 keeping the network adapter 140 supplied with descriptors for memory to deliver packets into. If the network adapter 140 uses all the descriptors before the host 105 publishes more, the network adapter 140 will usually drop any packets that arrive. However, as discussed above, using DMA to store the packets can result in the packets being stored in main memory, rather than the cache hierarchy 125. This may result in increased latency for the CPU 110 to retrieve these packets so they can be processed by the application 130. With CPU polling, the CPU 110 can ensure the requested data is stored in the CPU registers 115 which can reduce the time used to retrieve the data relative to storing the data in main memory or even in the cache hierarchy 124. While the embodiments discussing storing packets in the CPU registers 115, the techniques herein can be used to store the packets in the cache hierarchy 124 (e.g., L1 cache) which will improve latency relative to storing the packets in main memory.

In some embodiments, a cache coherency protocol is used to perform CPU polling to retrieve data from the network adapter 140, however, the standard PCIe protocol could also be used. One such cache coherency protocol is Compute eXpress Link (CXL). CXL is a recent innovation that reuses the PCIe physical layer, but provides three alternative transport protocols: CXL.io, CXL.mem and CXL.cache. Different devices use different combinations of these protocols to achieve their desired operations. CXL.io is a compatibility layer with the traditional PCIe transport layer, and provides (with some minor exceptions/extensions) equivalent operations. CXL.mem is not as rich as PCIe and tends to be focused on host access to device memory. It allows the host to perform low-level read and write operations to device memory, in a similar way to how the host would read and write local host memory. Notably, the latency of each operation is lower than current PCIe equivalents. Its operations are initiated by the host's "home agent". If the device wants to write to host memory this is supported via an operation that requests the host read from the device—i.e., the device push is turned into a host pull.

CXL.cache extends CXL.mem and provides a cache coherency protocol. This allows the host CPU 110 to read device memory (e.g., the memory in the network adapter 140) and store a copy in the CPU's local cache (e.g., the CPU registers 115 or the cache hierarchy 125) for faster subsequent access, and the device (or another CPU using the same region of memory) can invalidate the cached copy when it needs to change it or gain exclusive access.

While PCIe semantics can be used to poll the network adapter, the CXL.mem operations may further reduce latency. Thus, in one embodiment, CXL semantics can be used instead of PCIe semantics to implement the receive path between the host 105 and the network adapter 140. The aim is to benefit from the lower latency CXL operations to give faster movement of data between host and wire. Using CXL.mem instead could deliver higher performance than using CXL.io.

On the receive path, the network adapter 140 produces data that it wants the CPU 110 to consume, but CXL.mem does not offer an operation that allows the NIC to write directly to host memory. If it is used by the network adapter 140 to write to the host 105. CXL can perform this as three bus transitions: (i) network adapter 140 issues a write request; (ii) the host home agent handles the write request and converts it into an equivalent host read back to the network adapter 140; (iii) network adapter 140 responds to the host read with the data. Three bus transitions would have a combined latency that would put the latency equivalent to or higher than existing PCIe operations.

As mentioned above, previous solutions discover newly received packets by busy-polling the memory location that the network adapter will write to (either the packet contents or the event/metadata describing it). CXL.mem provides the host CPU 110 with a way to read memory in the network adapter 140 with much lower latency. Instead of busy polling a memory address, the network adapter 140 writes data to its own memory, and the CPU polls the network adapter 140 to discover it. This could be done on PCIe too, although it may be more complex to implement.

This shared memory queue in the network adapter 140 would likely be used in a circular fashion, potentially with metadata/events delivered alongside to describe the packet. There can also some flow control on this shared memory queue. This could either be done using shared read and write pointers where the host owns the read pointer and increments it once it has read some data and the network adapter 140 would own the write pointer and increment the pointer when the network adapter 140 has written some data, or using events and descriptors where the memory network adapter 140 effectively comes under the control of the host, and it issues descriptors to the network adapter 140 (as it currently does for host memory) to tell the network adapter 140 it is allowed to write to bits of it. In one embodiment, once the network adapter 140 has consumed a descriptor it does not write again until the host updates it with more descriptors.

In one embodiment, the network adapter 140 knows which regions of the buffer it has written to, and which the host 105 has successfully read data from. It can assume that the host 105 will only read each byte or word once, and so once the host 105 has read a byte, that region of the buffer becomes available for reuse without the host 105 having to explicitly indicate this.

Figure 2:
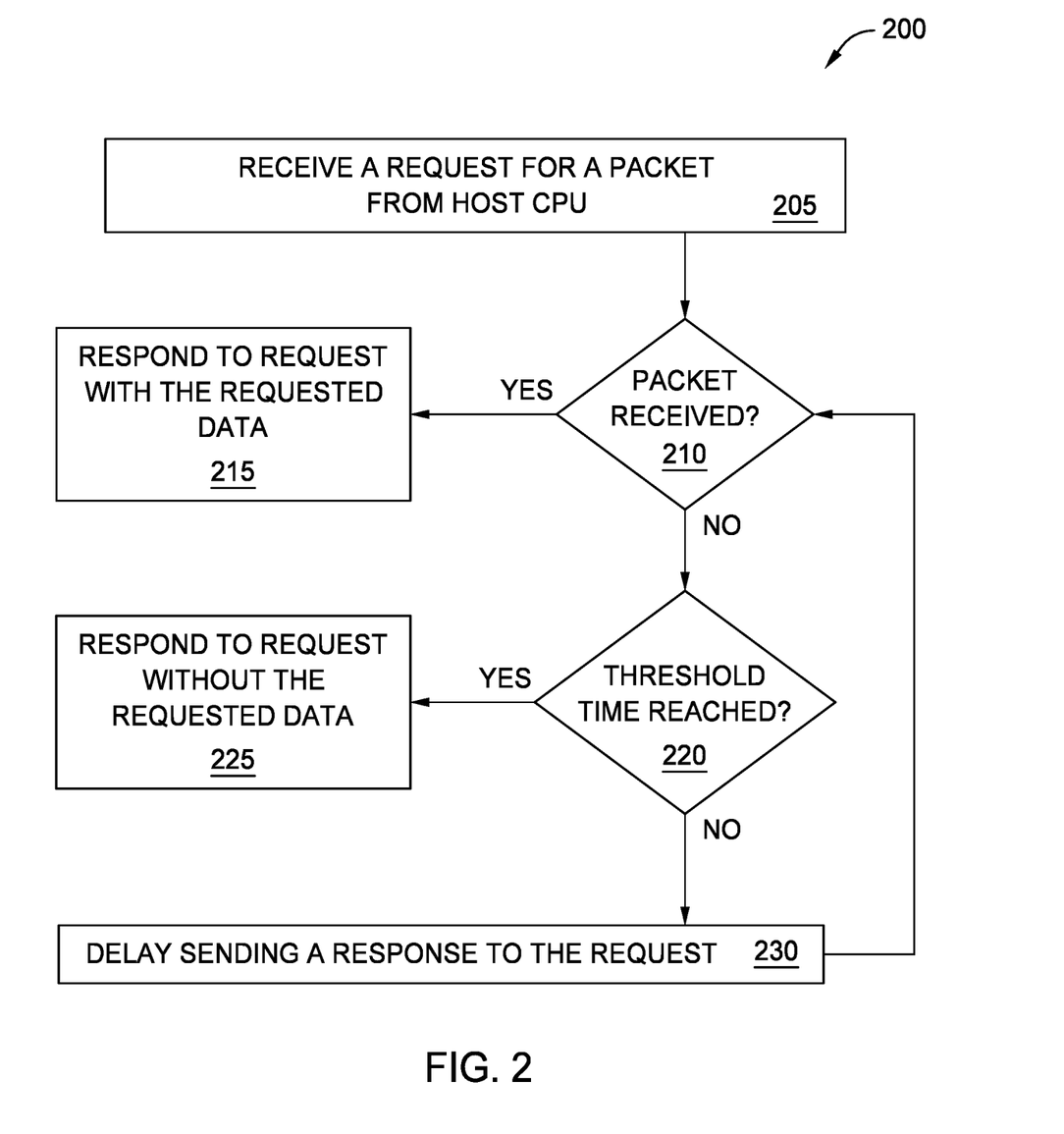
FIG. 2 is a flowchart for polling a network adapter, according to one embodiment.

FIG. 2 is a flowchart of a method 200 for polling a network adapter, according to one embodiment. At block 205, the network adapter (e.g., the network adapter 140 in FIG. 1) receives a request from the host CPU (e.g., the CPU 110 in FIG. 1). In one embodiment, the host CPU does not know if the packet has yet arrived at the network adapter. Thus, the request can be part of CPU polling. The host CPU can issue one request at a time, or it can issue multiple requests in parallel for different portions of the packet, which will be discussed in FIG. 4.

Further, while the method 200 describes a request for a packet, the request may instruct the network adapter to retrieve only a portion of the packet. For example, the request may poll the network adapter to see if it has received the header (or a portion of the header) of the packet.

At block 210, the network adapter determines whether the packet has been received. If so, the method 200 proceeds to block 215 where the network adapter responds to the request with the data that was requested (e.g., the packet or a portion of the packet).

However, if the network adapter has not received the packet from the network, the method 200 proceeds to block 220 where the network adapter determines whether a period of time (e.g., a threshold) for delaying the response to the packet has been reached. That is, in the method 200, the network adapter may not respond immediately if a requested packet has not yet been received. Instead, the network adapter can delay responding to the request in hopes the packet will arrive soon. Advantageously, this helps to avoid a situation where the packet arrives soon after the network adapter processes the request from the host CPU and determines the packet has not yet arrived.

The threshold time of the delay for responding can be a configurable parameter. For example, the delay time can be a tradeoff between waiting for the packet to arrive and filling a queue in the network adapter that stores the requests from the host CPU. In one embodiment, the threshold may be between 100 microseconds to 1 millisecond. Further, the period of time may be fixed or may change dynamically.

If the threshold time has not been reached, the method 200 proceeds to block 230 where the network adapter delays sending the response to the host CPU. That is, the network adapter waits before sending a response. The method 200 then returns to block 210 and repeats.

However, if the threshold time is met and the network adapter still has not received the packet, the method 200 proceeds to block 225 where the network adapter responds to the request without the data. That is, the network adapter informs the host CPU that the data has not yet arrived, thereby ending the read request. However, the host CPU is free to immediately transmit another read request to the network adapter for the same packet.

Advantageously, by delaying the response, the network adapter increases the chance that once the packet arrives the adapter can immediately forward the data to the host CPU using the PCIe connection. Moreover, the packet can be stored in the CPU registers (or L1 cache) which means it will take very little time for the CPU to retrieve and begin processing the packet.

Figure 3:
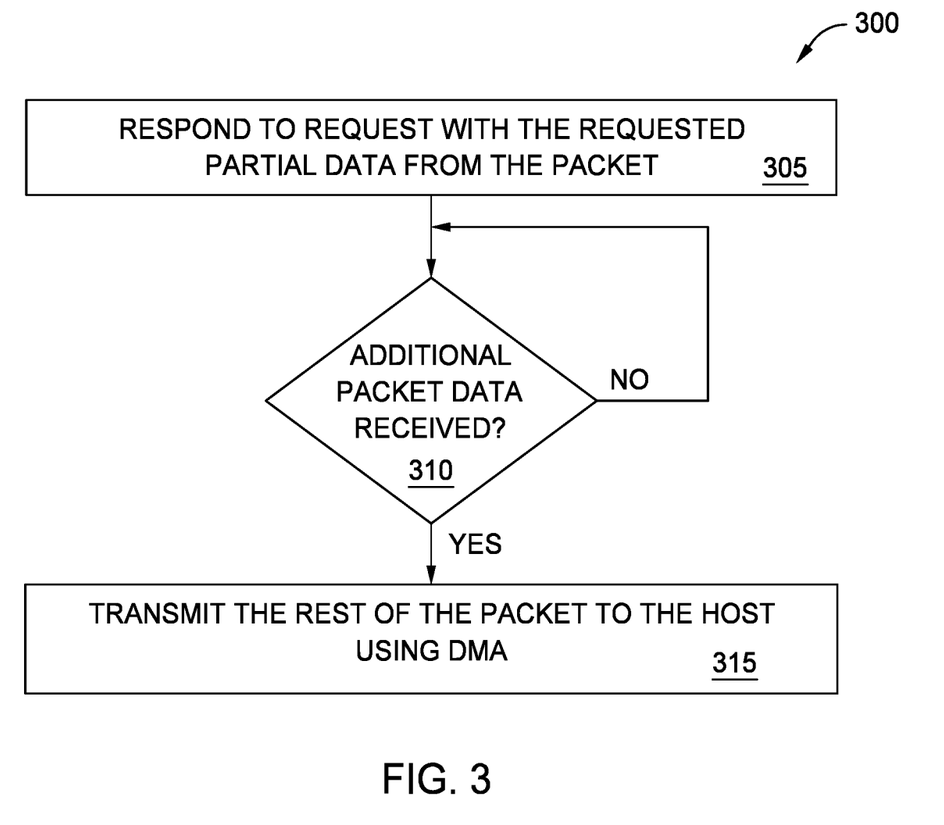
FIG. 3 is a flowchart for polling a network adapter and using DMA to receive data from a network, according to one embodiment.

FIG. 3 is a flowchart of a method 300 for polling a network adapter and using DMA to receive data from a network, according to one embodiment. While FIG. 2 can be used to retrieve portions of the packet (e.g., the host CPU uses one request to retrieve the first 64 bytes of the packet, a second request to retrieve the next 64 bytes of the packet, a third request to retrieve the next 64 bytes of the packet, and so forth), in the method 300 the network adapter provides a first portion of the packet using the method 200 (e.g., by the host CPU polling the network adapter) but provides a second portion (e.g., the remaining portion) of the packet using DMA.

At block 305, the network adapter responds to a request from the host CPU with the requested partial data of the packet. For example, the host CPU may use the method 200 to request the network adapter send only the headers of the packet. For example, the amount of data that can be requested by the host CPU may be limited using CXL.mem during each read request. In this case, since the host CPU cannot use one request to request the entire packet, it may request a portion of the packet that includes the headers.

At block 310, the network adapter determines whether additional packet data is received. That is, the network adapter may receive the packet in chunks from the network. Thus, it can receive the partial data of the packet that was requested in block 305 (and immediately forward it to the host CPU) before receiving the remaining portion of the packet. For example, the network adapter may send the header information (or a portion of the header information) at block 305 and then receive the rest of the packet (e.g., the payload, or some of the headers and the payload) at block 310.

If the rest of the packet is received, at block 315 the network adapter can use DMA to transfer this data to the host CPU. That is, the host CPU does not poll the network adapter to retrieve this portion of the packet. Instead, the network adapter is configured to (e.g., programmed to) transmit the remaining portion of the packet using DMA. The host CPU knows it should look in its DMA buffer to retrieve the remaining portion of the packet. Thus, the method 300 discloses using a mix of the host CPU polling the network adapter for a portion of the packet and the network adapter pushing the remaining portion of the packet to the host CPU using DMA.

Advantageously, the host CPU can receive the partial data quickly using the polling technique. The host CPU can then begin processing this data (e.g., the headers) while waiting for the rest of the packet to be received using the slower, DMA technique. As such, this reduces idle time and also avoids the host CPU from having to poll the network adapter to receive all of the packet data.

In another embodiment, once the network adapter has received the first portion of data (e.g., the first 64 bytes), if a request for the data is pending, the adapter replies to the request with the data. If a request for the data is not pending, the network adapter instead immediately writes the data using DMA. When a subsequent request for the data arrives, the network adapter can either reply indicating the data has been delivered with DMA, or can reply with the data directly.

Figure 4:
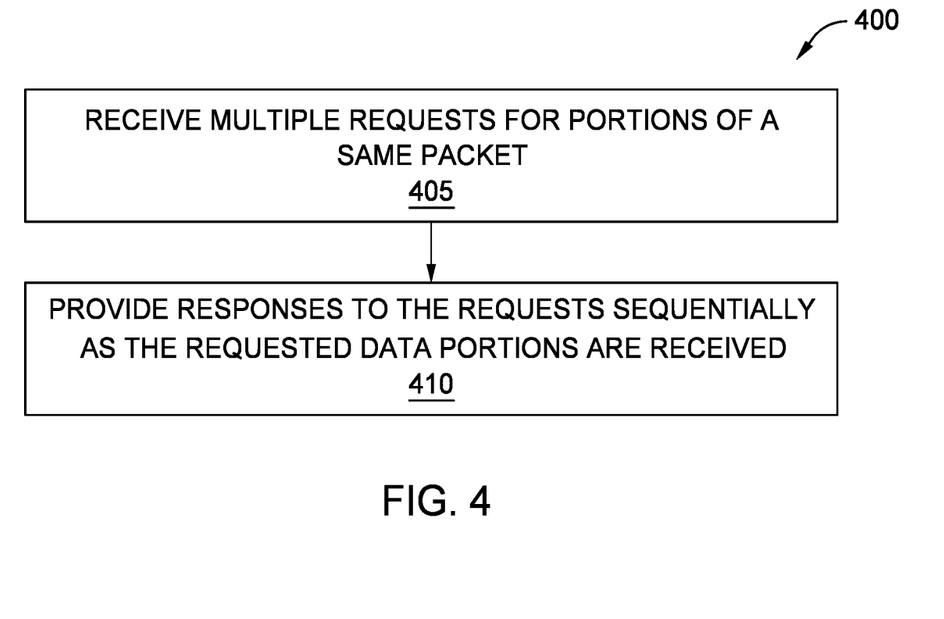
FIG. 4 is a flowchart for polling a network adapter using multiple requests, according to one embodiment.

FIG. 4 is a flowchart of a method 400 for polling a network adapter using multiple requests, according to one embodiment. In this method, the host CPU issues multiple request for the same packet (or different portions of the same packet).

At block 405, the network adapter receives multiple requests from the host CPU for portions of the same packet (e.g., a first 64 bytes of the packet, a second 64 bytes of the packet, a third 64 bytes of the packet, and so forth). The network adapter may process the requests sequentially. For example, it may receive three requests in parallel from the host CPU and queue these requests.

At block 410, the network adapter provides responses to the requests sequentially as the data is received. That is, the network adapter does not have to wait to receive all the data requested by each of the requests before responding. As each requested chunk of data is received, the network adapter can respond to the request and store the data in the host CPU without waiting for the next requested chunk of the packet to be received from the network.

As mentioned above in FIG. 2, the network adapter can delay the requests if it has not already received the data. In this way, the requests can be sitting in the network adapter's queue and the network adapter can respond as soon as the portions arrive (assuming the threshold time has not yet been reached).

Also, the multiple requests can correspond to different sizes of data. For example, the host CPU may know the first 32 byte of the packet contain header information that the host CPU needs to process before it can decide on how to process the remaining portion of the packet. Thus, the host CPU can issue a request just for the first 32 bytes. Thus, once this 32 bytes is received by the network adapter, it can immediately provide it to the host CPU without waiting for additional data (e.g., another 32 bytes of data, assuming each request can request a total of 64 bytes of data). The rest of the requests from the host CPU can ask for 64 bytes of data.

Figure 5:
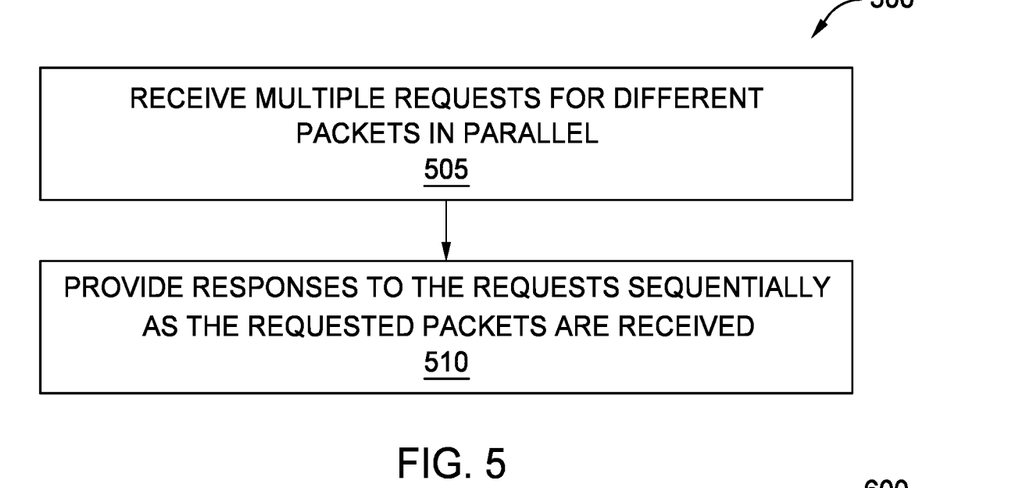
FIG. 5 is a flowchart for polling a network adapter using multiple requests, according to one embodiment.

FIG. 5 is a flowchart of a method 500 for polling a network adapter using multiple requests, according to one embodiment. At block 505, the network adapter receives multiple requests for different packets in parallel. The network adapter may process the requests sequentially. For example, it may receive three requests in parallel from the host CPU and queue these requests.

At block 510, the network adapter provides responses to the requests sequentially as the different packets are received. As mentioned above in FIG. 2, the network adapter can delay the requests if it has not already received the requested packet. In this way, the requests can sit in the network adapter's queue and the network adapter can respond as soon as the packets arrive (assuming the threshold time has not yet been reached).

Figure 6:
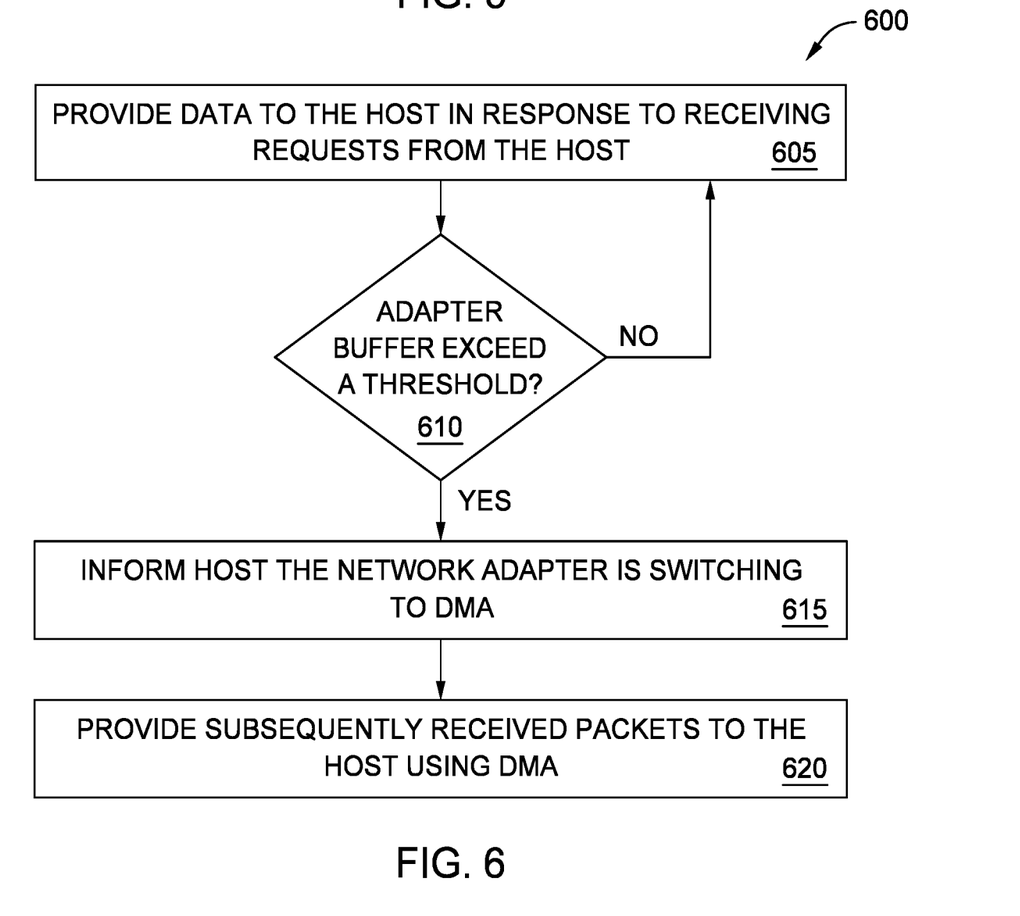
FIG. 6 is a flowchart for switching between polling a network adapter and using DMA to receive data from a network, according to one embodiment.

FIG. 6 is a flowchart of a method 600 for switching between polling a network adapter and using DMA to receive data from a network, according to one embodiment. For example, the network adapter may begin transmitting data to the host CPU using the host CPU polling technique described in FIG. 2 but then switch to using DMA where the network adapter pushes the packets to the host CPU because of, e.g., host CPU congestion.

At block 605, the network adapter provides data to the host in response to receiving requests from the host, e.g., as described in FIG. 2.

At block 610, the network adapter determines whether an adapter buffer used to store received packets in the network adapter exceeds a threshold—e.g., whether there is congestion in the buffer. Indications of congestion could be the buffer storing more than a threshold of packets, or the packets being stored in the buffer for more than a threshold amount of time. This may indicate that the host CPU is not keeping up with the network adapter. For example, the host CPU may be busy performing other tasks and cannot request the packets as fast as the network adapter is receiving them from the network. Or the host CPU may not want the packets with low latency at the moment.

If the threshold is reached, the method 600 proceeds to block 615 where the network adapter informs the host the network adapter is switching to DMA. Notably, the network adapter can tell the host the packet number or time it switched to using DMA. This is helpful since the host CPU typically processes the packet in a particular order, so this prevents the host CPU from processing the packets in an incorrect order.

At block 620, the network adapter provides subsequently received packets to the host using DMA. The network adapter may switch back to host CPU polling upon an instruction from the host CPU.

In the preceding, reference is made to embodiments presented in this disclosure. However, the scope of the present disclosure is not limited to specific described embodiments. Instead, any combination of the described features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the preceding aspects, features, embodiments and advantages are merely illustrative and are not considered elements or limitations of the appended claims except where explicitly recited in a claim(s).

As will be appreciated by one skilled in the art, the embodiments disclosed herein may be embodied as a system, method or computer program product. Accordingly, aspects may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium is any tangible medium that can contain, or store a program for use by or in connection with an instruction execution system, apparatus or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described below with reference to flowchart illustrations and/or block diagrams of methods, apparatus (systems) and computer program products according to embodiments presented in this disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods, and computer program products according to various examples of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the foregoing is directed to specific examples, other and further examples may be devised without departing from the basic scope thereof, and the scope thereof is determined by the claims that follow.

What is claimed is:

1. A network adapter, comprising:
   circuitry configured to:
      receive a request from a host central processing unit (CPU) for data in a packet, wherein the network adapter receives the packet from a network;
      upon determining the data has not been received, waiting a period of time before replying to the request; and
      upon determining the data has not been received before the period of time has passed, replying to the request indicating the data has not yet been received;
      upon replying to the request indicating the data has not yet been received, receive multiple requests for different portions of the packet in parallel from the host CPU; and
      provide responses to the multiple requests sequentially as the different portions of the packet are received at the network adapter.

2. The network adapter of claim 1, wherein the circuitry is configured to:
   receive a second request from the host CPU for the data in the packet; and
   upon determining the data has been received, replying to the request with the data received.

3. The network adapter of claim 2, wherein the data is stored in a register in the host CPU.

4. The network adapter of claim 2, wherein the data in the packet comprises a first portion of the packet, wherein the circuitry is configured to:
   transmit a second portion of the packet to the host CPU using direct memory access (DMA).

5. The network adapter of claim 1, wherein the host CPU is connected to the network adapter using a PCIe connection.

6. The network adapter of claim 5, wherein receiving the request and replying to the request are performed using a cache coherency protocol and the PCIe connection.

7. The network adapter of claim 1, wherein the circuitry is configured to:
   receive multiple requests for different packets in parallel from the host CPU; and
   provide responses to the multiple requests sequentially as the different packets are received at the network adapter.

8. The network adapter of claim 1, wherein the circuitry is configured to:
   determine that a buffer in the network adapter used to store packets indicates there is congestion; and
   inform, in response to determining there is congestion, the host CPU that the network adapter is switching from using host CPU polling to transfer packets to the host CPU to using DMA to transfer packets to the host CPU; and
   provide packets to the host using DMA after informing the host CPU.

9. The network adapter of claim 1, wherein the circuitry is configured to:
- receive a portion of the packet before receiving the request from the host CPU for the portion of the packet; and
- use DMA to transfer the portion of the packet to the host CPU without waiting to receive the request from the host CPU.

10. A method comprising:
- receiving, at a network adapter, a request from a host CPU for data in a packet, wherein the network adapter receives the packet from a network;
- upon determining the data has not been received, waiting a period of time before replying to the request; and
- upon determining the data has not been received before the period of time has passed, replying to the request indicating the data has not yet been received;
- upon replying to the request indicating the data has not yet been received, receive multiple requests for different portions of the packet in parallel from the host CPU; and
- provide responses to the multiple requests sequentially as the different portions of the packet are received at the network adapter.

11. The method of claim 10, further comprising:
- receiving, at the network adapter, a second request from the host CPU for the data in the packet; and
- upon determining the data has been received, replying to the request with the data received.

12. The method of claim 11, wherein the data is stored in a register in the host CPU.

13. The method of claim 10, wherein the data in the packet comprises a first portion of the packet, wherein the method further comprises:
- transmitting a second portion of the packet to the host CPU using DMA.

14. The method of claim 10, wherein receiving the request and replying to the request are performed using a cache coherency protocol and a PCIe connection.

15. The method of claim 10, further comprising:
- receiving multiple requests for different packets in parallel from the host CPU; and
- providing responses to the multiple requests sequentially as the different packets are received at the network adapter.

16. The method of claim 10, further comprising:
- determining that a buffer in the network adapter used to store packets indicates there is congestion; and
- informing, in response to determining there is congestion, the host CPU that the network adapter is switching from using host CPU polling to transfer packets to the host CPU to using DMA to transfer packets to the host CPU; and
- providing packets to the host CPU using DMA after informing the host CPU.

17. A network adapter, comprising:
circuitry configured to:
- receive multiple requests for different portions of a packet in parallel from a host CPU;
- after receiving the multiple requests, receive at least a portion of the packet from a network;
- upon determining the portion corresponds to one of the multiple requests, forward the portion of the packet to the host CPU.

18. The network adapter of claim 17, wherein the multiple requests are received before the network adapter has received at least the portion of the packet, wherein the circuitry is configured to:
- delay responding to the requests for a period of time in case the portion of the packet is received before the period of time has passed.

* * * * *